United States Patent [19]
Bakshi et al.

[11] Patent Number: 4,535,115
[45] Date of Patent: Aug. 13, 1985

[54] METHOD OF PREPARATION OF POLYIMIDE ACIDS

[75] Inventors: Kiran R. Bakshi, Murrysville; Walter P. Barie, Glenshaw; Edward T. Sabourin, Allison Park, all of Pa.

[73] Assignee: Gulf Oil Corporation, Pittsburgh, Pa.

[21] Appl. No.: 642,519

[22] Filed: Aug. 20, 1984

[51] Int. Cl.$^3$ ............................................. C08L 79/08
[52] U.S. Cl. ..................................... 524/376; 524/377; 524/376; 524/600; 528/353
[58] Field of Search ............... 524/376, 377, 378, 600; 528/353

[56] References Cited

U.S. PATENT DOCUMENTS

| 4,065,345 | 12/1977 | Progar et al. | 524/600 |
| 4,115,341 | 9/1978 | Boldebuck et al. | 524/376 |
| 4,181,641 | 1/1980 | Boldebuck et al. | 524/376 |
| 4,255,471 | 3/1981 | Boldebuck et al. | 524/376 |
| 4,332,708 | 6/1982 | Boldebuck et al. | 524/376 |
| 4,382,126 | 5/1983 | Boldebuck et al. | 524/376 |

Primary Examiner—Lester L. Lee
Attorney, Agent, or Firm—Deane E. Keith; Forrest D. Stine; Richard C. Gaffney

[57] ABSTRACT

A one-step solution technique for preparing an aromatic polyimide acid which comprises reacting an aromatic dianhydride with an aromatic diamine in the presence of diglyme and a sufficient amount of a co-solvent to maintain the polyimide acid in solution, said co-solvent having the formula:

ROH where R is H, an aliphatic branched or straight-chain hydrocarbon having from 1 to 5 carbon atoms or a methoxy substituted aliphatic branched or straight-chain hydrocarbon having from 1 to 5 carbon atoms.

12 Claims, No Drawings

METHOD OF PREPARATION OF POLYIMIDE ACIDS

This invention relates to a method of producing a solution of a polyimide acid in one step using diglyme as the solvent.

BACKGROUND OF THE INVENTION

The reaction of aromatic dianhydrides such as benzophenone tetracarboxylic dianhydride (BTDA) with aromatic diamines to produce a polyimide acid which can then be heated to produce a polyimide is well known in the art. Such polyimides are useful as adhesives, molding powders and films having excellent chemical resistance and thermal resistivity properties. U.S. Pat. No. 4,065,345 to Donald J. Progar, et. al. describes a method for preparing an adhesion solution of a polyimide acid by reacting an aromatic dianhydride with an aromatic diamine in the presence of certain specified ether solvents including diglyme and other aliphatic acyclic ethers. Progar, et al. teach in column I, lines 57 et seq., that "in certain instances, a highly viscous polyamicacid intermediate polymer precipitates from the ether solvents. The addition of very small amounts of water or alcohol generally leads to redissolution of a polyamic-acid to give a viscous polymer solution."

We confirm the above findings when diglyme, a preferred solvent due to availability and boiling point, is used. The two-step technique of Progar, et al. suffers from the fact that it is a two-step process but more particularly because the precipitated polymer severely limits the type and size of equipment which can be employed commercially. Progar, et al. in their Example II (columns 5 and 6), which uses diglyme as the solvent, employs a household blender to perform the experiment. The normal paddle-stirred devices cannot be employed as the precipitated polymer tends to wrap itself around the paddle blades resulting in potential damage, stoppage and other problems such as an increased energy usage. All of the above problems are overcome using the method of this invention.

BRIEF DESCRIPTION OF THE INVENTION

In accordance with the invention, a solution of an aromatic polyimide acid is prepared in a single step one-phase reaction by reacting an aromatic dianhydride with an approximately equimolar quantity of an aromatic diamine in the presence of a solvent comprising diglyme and an amount of a co-solvent sufficient to maintain the polyimide acid product in solution. The co-solvent has the formula ROH where R can be H, an aliphatic branched or straight-chain hydrocarbon having from 1 to 5 carbon atoms or a methoxy substituted aliphatic branched or straight-chain hydrocarbon having from 1 to 5 carbon atoms.

It was quite surprising to find that the addition of a co-solvent such as ethanol or methanol and especially water to the initial reaction mixture of the diglyme, dianhydride and diamine would not seriously interfere with the expected reaction between the aromatic dianhydride and the aromatic diamine. It is known that alcohols and especially water react with aromatic dianhydrides to produce acids and esters. Proger undoubtedly recognized this as he teaches the use of small amounts of water or alcohols to re-dissolve the precipitated aromatic polyimide acid. It was expected therefore that the addition of water or alcohols as a co-solvent with diglyme would result in products having lowered molecular weights outside of the useful range. It was surprising to find that the inherent viscosity (a measure of molecular weight) of the products using the method of this invention was substantially the same as the inherent viscosity of the products using the two-step procedure of Proger. It was additionally found that the one-step procedure of this invention cannot be practiced using monoglyme as the reaction solvent.

Any aromatic dianhydride can be employed in the process of this invention, but particularly preferred are the aromatic dianhydrides having the formula:

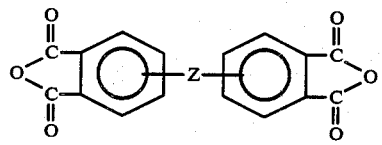

where Z is selected from the group consisting of —O— and

Examples of suitable dianhydrides include:
3,3',4,4'-benzophenone tetracarboxylic acid dianhydride
2,3,3',4'-benzophenone tetracarboxylic acid dianhydride
2,2',3,3'-benzophenone tetracarboxylic acid dianhydride
bis(3,4-dicarboxyphenyl)ether dianhydride
bis(2,3-dicarboxyphenyl)ether dianhydride
(2,3-dicarboxyphenyl)(3,4-dicarboxyphenyl)ether dianhydride Any aromatic diamine can be employed in the process of this invention but particularly preferred are those having the formula:

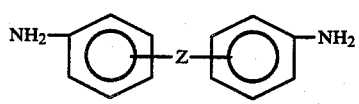

where Z is selected from the group consisting of —O— and

Examples of suitable aromatic diamines include:
3,3'-diaminobenzophenone
3,4'-diaminobenzophenone
4,4'-diaminobenzophenone
bis-(3-aminophenyl)ether
bis-(4-aminophenyl)ether
3,4'-diaminodiphenyl ether The aromatic dianhydride, exemplified by BTDA, and the aromatic diamine, exemplified by m, m'-diaminobenzophenone (DABP), react together to form an aromatic polyimide acid as illustrated in Equation I below:

Equation I:

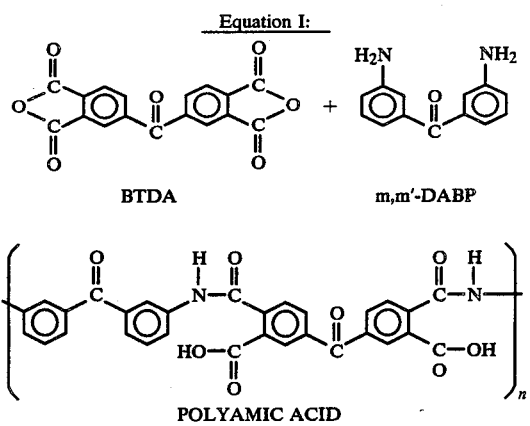

BTDA + m,m'-DABP

POLYAMIC ACID

On heating, the polyimide acid undergoes thermal imidization to form a thermoplastic polyimide having the recurrent unit:

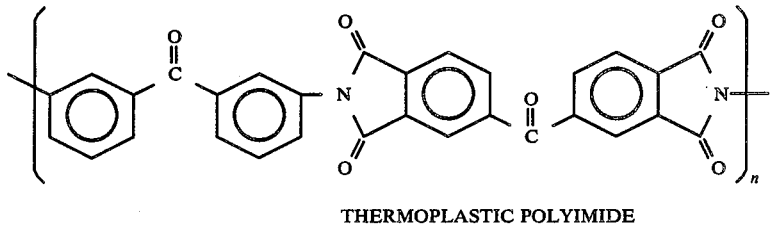

THERMOPLASTIC POLYIMIDE

The solvent to employ in the method of this invention is diglyme (i.e., bis(2-methoxyethyl)ether) having the formula: $CH_3-O-CH_2-CH_2-O-CH_2-CH_2-O-CH_3$.

The co-solvent can be water or a monohydric aliphatic alcohol having from 1 to 5 carbon atoms and optionally an ether linkage. The co-solvent can have the formula:

ROH where R can be H, an aliphatic branched or straight-chain hydrocarbon having from 1 to 5 carbon atoms or a methoxy substituted aliphatic branched or straight-chain hydrocarbon having from 1 to 5 carbon atoms.

Examples of suitable co-solvents include: water, methanol, ethanol, propanol, isopropyl alcohol, and butanol.

The amount of the diglyme solvent to employ should be sufficient for ease of mixing and to provide a heat-sink control for the temperature of reaction. Usually the amount of diglyme is from 65 to 90 weight percent of the total reaction mixture but the amount is not critical and suitable amounts can easily be determined by those having ordinary skill in the art.

The amount of co-solvent to employ is preferably kept to a minimum since the co-solvent could also function as a reactant and this is undesirable and should be avoided. The amount of co-solvent to employ is that which is sufficient to maintain the aromatic polyimide acid in solution in the reaction vessel. This amount can be determined quite simply and is usually in the range of 0.5 to 5 mols of co-solvent per mol of aromatic diamine and more usually is from 0.7 to 3 mols of co-solvent per mol of diamine.

The reaction is usually run by forming an initial slurry of the diglyme, co-solvent and aromatic diamine in a suitable reaction vessel equipped with a stirring means and temperature-sensing device. The aromatic dianhydride is then slowly added so as to maintain a reaction temperature less than the temperature of imidization. The temperature of imidization is usually about 40° C. and above. The reaction temperature is thus preferably from about room temperature to about 40° C. Lower temperatures can be used but provide no advantage and the reaction rate is, of course, lowered. The pressure of reaction is not critical and can be any suitable pressure. Atmospheric pressure is preferred for economic reasons. The reaction time is also not critical and is usually from about 1 to about 6 hours or more, usually from 2 to 4 hours.

The product solution of the aromatic polyimide acid can be used directly as an adhesive provided the molecular weight of the products are in the appropriate adhesive range (i.e., an inherent viscosity of about 0.5 to 1.0 at a temperature of about 25° C. for 0.5 percent solution dimethyl acetamide using ASTM test D2857).

The process of this invention is also useful for preparing molding powders and films, depending on the molecular weight of the polyimide acid. Some control over the molecular weight of the products is achieved by a careful control of the mol ratio of the aromatic dianhydride to the aromatic diamine. The mol ratio of the dianhydride to the diamine is usually about stoichiometric although a molar range from about 0.95 to 1 to 1.05 is satisfactory.

The curing of the adhesive or the preparation of the polyimide films and powders from the aromatic polyimid acids produced by the method of this invention is well known to occur thermally with the production of by-product water.

PREFERRED EMBODIMENTS

The invention will be further described with reference to the following experimental work.

In all of the runs in Table I below, the aromatic dianhydride employed was 3, 3', 4, 4' benzophenone tetracarboxcyclic acid dianhydride (BTDA); and the aromatic diamine was m,m'-diaminobenzophenone (DABP). The DABP was added to a stirred reactor of appropriate size along with the diglyme and co-solvent and stirred vigorously. BTDA was then added as a fine powder at a rate such that the temperature was maintained below 40° C. to prevent imidization.

The initial slurry forms a clear, dark amber solution after about 25 percent of the BTDA was added. No phase separation was observed during the remainder of the run.

The runs using the above procedure are summarized in Table I below.

TABLE I

ONE-STEP ONE-PHASE SOLUTION POLYMERIZATION TO FORM AN AROMATIC POLYIMIDE ACID

| Example No. | Alcohol | ROH g (mols) | DABP g (moles) | BTDA g (moles) | Diglyme, g | WT % Solids | Inh. vis.[a] at 25° C. |
|---|---|---|---|---|---|---|---|
| 1 | Methanol | 3.96 (.124) | 7.80 (.0368) | 11.85 (.0368) | 93.0 | 16.8 | 0.616 |
| 2 | Methanol | 1.97 (.062) | 7.80 (.0368) | 11.85 (.0368) | 93.0 | 19.1 | 0.648 |
| 3 | Methanol | 2.00 (.062) | 15.6 (.0736) | 23.70 (.0736) | 93.0 | 29.3 | 0.796 |
| 4 | Methanol | 35.1 (1.097) | 283.0 (1.335) | 430.2 (1.336) | 1630 | 30.0 | 0.753 |
| 5 | Methanol | 84.2 (2.631) | 333.3 (1.572) | 506.4 (1.573) | 3974.4 | 17.1 | 0.705 |
| 6 | Ethanol | 2.9 (.063) | 7.80 (.0368) | 11.85 (.0368) | 93.0 | 17.0 | 0.571 |
| 7 | Water | 2.0 (.1111) | 7.80 (.0368) | 11.85 (.0368) | 93.0 | 17.1 | 0.689 |
| 8 | Methanol | 800 (25.0) | 5910 (27.9) | 8990 (27.9) | 36900 | 28.3 | 0.780 |

[a]Determined on a 0.5% solution in dimethyl acetamide by ASTM Test D2857 as deciliters per gram.

Referring to Table I, Examples 1–5 and 8 show the use of methanol as a successful co-solvent in small (Examples 1–3) and larger size (Examples 3–5 and 8) runs illustrating there is no problem regarding scale-up of the reaction since a polymer mass does not precipitate. Examples 6 and 7 illustrate that ethanol and water can also be used as the co-solvent.

A series of runs was made which used the same procedure as the runs in Table I above except no co-solvent was employed. In each run a polymer mass precipitated during reaction and the polymer mass was redissolved using either methanol or ethanol as indicated in the summary of the runs in Table II below.

TABLE II

POST-REACTION ADDITION OF ALCOHOL

| Example No. | Alcohol | ROH g (moles) | DABP g (moles) | BTDA g (moles) | Diglyme, g | WT % Solids | Inh. vis.[a] at 25° C. | Comments |
|---|---|---|---|---|---|---|---|---|
| 9 | Methanol | 5.60 (.175) | 15.6 (.0736) | 23.70 (.0736) | 72.9 | 34.8 | 0.640 | Very difficult to get into solution |
| 10 | Methanol | 5.60 (.175) | 15.6 (.0736) | 23.70 (.0736) | 93.0 | 28.5 | 0.654 | Very difficult to get into solution |
| 11 | Ethanol | 7.80 (.170) | 7.8 (0.368) | 11.85 (.0368) | 93.6 | 16.2 | 0.740 | |
| 12 | Ethanol | 230 (5.00) | 157.5 (0.743) | 239 (0.743) | 1896 | 15.7 | 0.660 | Biggest batch possible because of glumping of polymer and redissolving |
| 13 | Ethanol | 230 (5.00) | 157.5 (0.743) | 239 (0.743) | 1896 | 15.7 | 0.680 | Biggest batch possible because of glumping of polymer and redissolving |
| 14 | Ethanol | 230 (5.00) | 157.5 (0.743) | 239 (0.743) | 1896 | 15.7 | 0.808 | Biggest batch possible because of glumping of polymer and redissolving |
| 15 | Ethanol | 230 (5.00) | 157.5 (0.743) | 239 (0.743) | 1896 | 15.7 | 0.764 | Biggest batch possible because of glumping of polymer and redissolving |
| 16 | Ethanol | 230 (5.00) | 157.5 (0.743) | 239 (0.743) | 1896 | 15.7 | 0.709 | Biggest batch possible because of glumping of polymer and redissolving |

[a]Determined on a 0.5% solution in dimethyl acetamide by ASTM Test D2857 as deciliters per gram.

Referring to Table II, the products from Examples 9 and 10 were difficult to redissolve, but eventually went back into solution. It should also be noted that the largest batch runs were Examples 12–16 using 239 grams of BTDA (compared to Example 8 in Table I, which used 8,990 grams of BTDA). The amount of BTDA used in Examples 12–16 was deemed the largest possible due to the difficulties in stirring for resolution.

An overall comparison of the runs from Tables I and II above shows that the inherent viscosity of the products was about the same, which illustrates that, quite unexpectedly, the presence of a co-solvent during the reaction does not interfere to produce lower molecular weight products. The inherent viscosity was determined at 25° C. using ASTM Test No. D2857.

Obviously, many modifications and variations of the invention, as hereinabove set forth, can be made without departing from the spirit and scope thereof, and therefore only such limitations should be imposed as are indicated in the appended claims.

We claim:

1. A one-step method for preparing a solution of an aromatic polyimide acid which comprises:

reacting an aromatic dianhydride with an approximately equimolar quantity of an aromatic diamine to produce a polyimide acid in the presence of a solvent comprising diglyme and an amount of a co-solvent sufficient to maintain said polyimide acid in solution, said co-solvent having the formula:

ROH where R can be H, an aliphatic branched or straight-chain hydrocarbon having from 1 to 5 carbon atoms or a methoxy substituted aliphatic branched or straight-chain hydrocarbon having from 1 to 5 carbon atoms.

2. A method according to claim 1 wherein said co-solvent is water.

3. A method according to claim 1 wherein said co-solvent is methanol.

4. A method according to claim 1 wherein said co-solvent is ethanol.

5. A method according to claim 1 wherein the mol ratio of the co-solvent to aromatic diamine is from 0.5:1 to 5:1.

6. A method according to claim 1 wherein the dianhydride has the formula:

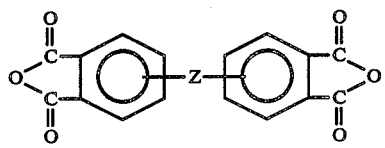

where Z is selected from the group consisting of —O— and

7. A method according to claim 6 wherein the dianhydride is 3,3',4,4'-benzophenone tetracarboxcyclic acid dianhydride.

8. A method according to claim 1 wherein the aromatic diamine has the formula:

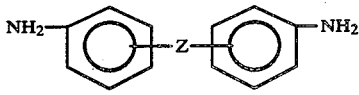

where Z is selected from the group consisting of —O— and

9. A method according to claim 8 wherein the aromatic diamine is m,m'-diaminobenzophenone.

10. A method according to claim 5 wherein the co-solvent is water, the dianhydride is 3,3',4,4'-benzophenone tetracarboxcyclic acid dianhydride and the diamine is meta, meta' diaminobenzophenone.

11. A method according to claim 1 wherein the aromatic dianhydride is added to a slurry of the aromatic diamine, the solvent and co-solvent at a rate such that the temperature of reaction is maintained at a temperature below the temperature where imidization occurs.

12. A method according to claim 11 wherein the reaction temperature is less than about 40° C.